United States Patent
Nagasawa

(10) Patent No.: US 6,868,306 B2
(45) Date of Patent: Mar. 15, 2005

(54) PLATE PARTS CARRYING SYSTEM

(75) Inventor: Atsuo Nagasawa, Inuyama (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 184 days.

(21) Appl. No.: 10/278,937

(22) Filed: Oct. 24, 2002

(65) Prior Publication Data
US 2003/0082039 A1 May 1, 2003

(30) Foreign Application Priority Data

| Oct. 25, 2001 | (JP) | ........................................ | 2001-327605 |
| Oct. 25, 2001 | (JP) | ........................................ | 2001-327606 |
| Dec. 20, 2001 | (JP) | ........................................ | 2001-387360 |

(51) Int. Cl.$^7$ .............................................. G06F 7/00
(52) U.S. Cl. ..................... 700/213; 198/468.4; 414/797
(58) Field of Search ............................... 700/213, 228; 198/468.2, 468.3, 468.4, 470.1; 414/797

(56) References Cited

U.S. PATENT DOCUMENTS

| 3,860,125 A | * | 1/1975 | Johnson et al. ............. 198/394 |
| 3,888,359 A | * | 6/1975 | Moline ....................... 271/267 |
| 3,960,276 A | * | 6/1976 | Gerhardt .................. 198/468.4 |
| 4,934,112 A | * | 6/1990 | Jackson ....................... 451/80 |
| 5,005,318 A | * | 4/1991 | Shafir .......................... 451/70 |
| 5,103,965 A | * | 4/1992 | Takahashi et al. ........ 198/468.4 |
| 5,609,717 A | * | 3/1997 | Pascale et al. .............. 156/556 |
| 6,463,762 B1 | * | 10/2002 | Ross, Jr. ....................... 65/105 |
| 6,543,604 B1 | * | 4/2003 | Pung et al. .............. 198/468.4 |

FOREIGN PATENT DOCUMENTS

| JP | 6-15487 | 1/1994 |
| JP | 10-133728 | 5/1998 |
| JP | 3211789 | 7/2001 |

* cited by examiner

*Primary Examiner*—Khoi H. Tran
(74) *Attorney, Agent, or Firm*—Westerman, Hattori, Daniels & Adrian LLP

(57) ABSTRACT

A plate parts carrying system that is capable of sucking the plate parts to be processed automatically without having trouble with the supply of the carrying program, which makes a specified value of the sucking position easily.

A carrying program 8 is transmitted from an automatic programming device 9 to a plate loader control unit 6 through a communication network 10. The carrying program 8 includes a specified value of a sucking position Q that is a stop position for sucking a plate parts M that are cut off by a plate processor 1. A sucking position change operation means 23 that changes the above specified value is provided for when suction parts 3 of a plate loader 2 cannot suck plate parts M at the specified value. The plate loader control unit 6 comprises a change output means 27 that outputs the specified value of the changed sucking position Q to the automatic programming device 9.

6 Claims, 8 Drawing Sheets

PLATE PARTS CARRYING SYSTEM

FIELD OF THE INVENTION

The present invention relates to a plate parts carrying system that a plate loader sucks plate parts that are cut out from a plate by a plate processor such as a punch press or a laser processor, etc. and carries the parts out from the plate processor. More particularly, the present invention relates to a control creation and a program creation of the plate parts carrying system.

Moreover, the another present invention relates to a control unit of the plate loader that sucks and carries the plate parts that are cut out from the plate processor such as the punch press or the laser processor, etc. More particularly, the present invention relates to a changing process of a specified value showing the sucking position.

BACKGROUND OF THE INVENTION

The plate loader, which is capable of traveling to the front, back, right, and left, sucks the plate parts that are cut out from the plate by the plate processor such as the punch press and the laser processor, etc. and carries the plate parts out from the plate processor. The plate parts that are cut out from the plate processor differ in shape and size, so that it is preferable to specify the sucking position that is a stop position to the horizontal direction when sucking the suction member correctly, with respect to each plate part. When the sucking position is not specified correctly, there are possibilities that the plate loader cannot suck the plate parts and the plate parts are dropped from the plate loader even if the plate loader can suck the plate parts.

Thus, the information for specifying the sucking position is added to the carrying program that controls the plate loader with coordinate value, with respect to each plate part.

However, it takes a lot of trouble to create the above carrying program as the sucking position of the plate loader differs according to the plate part, so that people try to create the carrying program including the specified value of the sucking position when the automatic programming device creates the process program for the plate processor. The created carrying program is transferred to the plate loader control unit, using a portable recording medium such as a floppy disk and a magnetic optical disk.

It takes much time and trouble to copy the carrying program and transfer it with the portable recording medium. Therefore, people try to create the system that the automatic programming device creates the carrying program including the instruction of the sucking position, as well as the process program, and the plate loader can suck the plate parts to be processed. However, the system is unrealized.

Moreover, it is difficult to change the specified value of the sucking position on the spot in automatic operation, in the conventional plate parts carrying system, if the specified value of the sucking position of any plate parts is inappropriate in the carrying program. Furthermore, it is repeated that the inappropriate specified value is given again to the plate parts that need to change the specified value of the sucking position when creating the other carrying program.

Additionally, it is highly likely that the similar suction failure is occurred to the same plate parts, as a plurality of the same parts that are in same shape and size may be included in the plate parts that are cut out from the plate, even if changing the specified value of only the plate parts that actually occur the suction failure.

It is an object of the present invention to provide a plate parts carrying system that the plate loader can suck the plate parts to be processed automatically without taking much trouble to supply a carrying program from an automatic programming device to a plate loader control unit.

Another object of the present invention is that a specified value of the sucking position can be changed on the spot in automatic mode and the sucking position can be surely and quickly changed in automatic control, if the specified value of the sucking position of any plate parts is inappropriate in the carrying program.

It is still another object of the present invention that, if the specified value of the sucking position of the plate parts is changed on the spot, the change of the specified value of the sucking position is reflected in the same kind of the plate parts when creating the next program, and the appropriate carrying program can be easily created.

It is a further object of the present invention to provide a plate loader control unit, which is capable of changing the specified value of the sucking position or the same parts automatically, preventing the suction failure of the same parts in advance, and cutting the changing operation by man power, if the specified value of the sucking position of any plate parts is changed as the value is inappropriate. It is a still further object of the present invention that the specified value of the sucking position can be changed to the original value immediately even if the changed specified value of the sucking position is wrong and the specified value can be easily changed again. An additional object of the present invention is to search the same parts easily and to check the parts by workers easily.

SUMMARY OF THE INVENTION

A preferred embodiment of the present invention will be described with reference to FIG. 1.

The plate parts carrying system comprises an automatic programming device (9) that creates a process program (7) and a carrying program (8), and a plate loader control unit (6) that controls a plate loader (2) based on the carrying program (8) transmitted from the automatic programming device (9) through a communication line (10). The plate loader (2) comprises a suction member (3) that sucks the plate (W), and a suction member transfer means (4) that transfers the suction member (3) to the horizontal direction. The carrying program (8) includes a value that specifies a sucking position (Q) that is the stop position of the suction member (3) to the horizontal direction for sucking the plate parts (M) that are cut out from the plate (W) by a plate processor (1) based on the process program (7).

According to the above configuration, the automatic programming device (9) creates the process program (7) and the carrying program (8). The carrying program (8) includes an instruction of specifying the above sucking position (Q). The created carrying program (8) is transmitted to the plate loader control unit (6) through the communication line (10), and the plate loader control unit (6) controls the plate loader (2) based on the transmitted carrying program (8). The control makes the plate loader (2) stop at a specified value of the sucking position (Q) and suck the plate parts (M) that are cut out from the plate material (W) by the plate processor (1). The automatic programming device (9) and the plate loader control unit (6) are connected by the communication line (10), so that it does not take much trouble to offer the carrying program (8) to the plate loader control unit (6), and the plate parts (M) to be processed can be sucked automatically.

The plate loader control unit (6) may be equipped with a sucking position change operation means (23) that changes a specified value of the sucking position (Q) for when the suction member (3) cannot suck the plate parts (M) at a specified value of the sucking position (Q).

When the sucking position change operation means (23) is provided in the plate loader control unit (6) as described above, a specified value of the sucking position (Q) can be changed on the spot in automatic mode and the sucking position (Q) can be quickly and surely changed by the automatic control, if the specified value of the sucking position (Q) of any plate parts (M) is inappropriate in the carrying program.

The plate loader control unit (6) can be equipped with a change output means (27) that outputs a specified value of the changed sucking position (Q) to the automatic programming device (9). When creating the new carrying program (8), the automatic programming device (9) reflects the specified value of the sucking position (Q) after changing that is output from the change output means (27) to the specified value of the sucking position of the same plate parts (M) as the plate parts (M) whose specified value is changed and the plate parts (M) that have a predetermined relation.

In case of the above configuration, when a specified value of the sucking position (Q) is changed by the plate loader control unit (6), the changed specified value is output to the automatic programming device (1) by the change output means (27). The automatic programming device (1) reflects the changed and output specified value to the specified value of the sucking position (Q) when creating the next program, regarding the same kind of the plate parts (M).

Thus, the appropriate carrying program (8) can be easily created for the plate parts (M) whose specified values are wrong. The parts (M) which have a predetermined relation as described above mean the parts whose shape and size are similar to the extent without any troubles if the specified value of the sucking position (Q) is set to be same by the suction member (3), and it is determined by the standard that is set from time to time.

The other plate parts carrying system of the present invention comprises the plate loader control unit (6) that controls the plate loader (2) based on the carrying program (8) and the automatic programming device (9) that is capable of creating the process program (7) and the carrying program (8). The plate loader (2) comprises the suction member (3) that sucks the plate (W) and the suction member transfer means (4) that transfers the suction member (3) to the horizontal direction. The carrying program (8) includes a value that specifies the sucking position (Q) that is the stop position of the suction member (3) to the horizontal direction for sucking the plate parts (M) that are cut out from the plate (W) by the plate processor (1) based on the process program (7). The plate loader control unit (6) comprises the sucking position change operation means (23) that changes the specified value of the sucking position (Q) and the change output means (27) that outputs the specified value of the changed sucking position (Q) to the automatic programming device (9), for when the suction member (3) cannot suck the plate parts (M) at the specified value of the sucking position (Q). When creating the new carrying program (8), the automatic programming device (9) reflects the specified value of the sucking position (Q) after changing that is output from the change output means (27) to the specified value of the sucking position of the same plate parts (M) as the plate parts (M) whose specified values are changed or the plate parts (M) that have a predetermined relation.

According to the above configuration, the plate loader control unit (6) controls the plate loader (2) based on the carrying program (8). The carrying program (8) is not limited to the program that is created by the above automatic programming device (9) and the program may be created by a proper means, however the carrying program (8) includes the instruction specifying the above sucking position (Q). According to the control based on the carrying program, the plate loader (2) stops at the specified value of the sucking position and sucks the plate parts when the plate processor (1) sucks the plate parts (M) that are cut out from the plate (W).

If the specified value of the sucking position (Q) of any plate parts (M) is inappropriate in the carrying program (8), the sucking position change operation means (23) of the plate loader control unit (6) can change the specified value of the sucking position (Q) on the spot in automatic operation. Therefore, the sucking position (Q) can be quickly and surely changed by the automatic control. When the plate loader control unit (6) changes the specified value of the sucking position (Q), the changed specified value is output to the automatic programming device (1) by the change output means (27). As a result, the specified value may be output to the automatic programming device (1) by the change output means (27) through the recording medium or the communication network (10). The automatic programming device (1) reflects the changed and output specified value to the specified value of the sucking position (Q), regarding the same kind of the plate parts (M), when creating the next program. Therefore, the proper carrying program (8) can be easily created to the plate parts (M) whose specified values are wrong.

Another preferred embodiment of the present invention corresponding the other invention would be described with reference to FIG. 1. The plate loader control unit (6), which controls the plate loader (2) having the suction member (3) that sucks the plate parts (M) and the suction member transfer means (4) that transfers the suction member (3) to the horizontal direction, comprises a suction information group (19) that specifies the specified value of the sucking position (Q) that is the stop position of the suction member to the horizontal direction when sucking the plate parts (M) that are cut out from the plate (W) by the plate processor (1) with reference to one group of the respective plate parts (M), and a transfer control unit (16) that controls the sucking position (Q) by transferring the suction member transfer means (4) based on the specified value of the suction information group (19). The plate loader control unit (6) comprises the sucking position change operation means (23) that changes a specified value of the sucking position (Q) to the desired plate parts (M) of the suction information group (19), a same parts search means (24) that searches the same parts (M) as the plate parts (M) whose specified value of the sucking position (Q) is changed from the suction information group (19), and an automatic rewrite means (25) that rewrites a specified value of the sucking position (Q) of the searched respective plate parts (M) to the same specified value of the changed sucking position (Q). The above one group of the respective plate parts (M) means such as the respective plate parts (M) in one sheet of the plate (W) that becomes a material.

According to the above configuration, the transfer control unit (16) transfers the suction member transfer means (4) based on a specified value of the sucking position (Q) in the suction information group (19) in automatic operation, and controls the sucking position (Q). When the suction failure occurs in automatic operation and it turns out that the specified value of the sucking position (Q) in any plate parts (M) is inappropriate, the specified value of the sucking position (Q) of the plate parts (M) is input to the sucking position change operation means (23) and changed the value by the operator. When the specified value of the sucking position (Q) of one plate part (M) is changed as described above, the same parts search means (23) searches the same parts (M) as the plate parts (M) whose specified values of the sucking position (Q) are changed from the above suction information group (19). The automatic rewrite means (25) rewrites the specified value of the sucking position (Q) of the searched respective plate parts (M) to the same specified value of the above changed sucking position. Therefore, when a specified value of the sucking position (Q) in one plate part (M) is changed, the specified value of the sucking position (Q) is changed to the same value, regarding the whole same parts (M) in one group of the plate parts (M). Consequently, the specified value of the sucking position in the same parts (M) can be changed automatically regarding the same parts, the suction failure in the same parts (M) can be prevented in advance, and a manual change operation can be eliminated.

The sucking position change operation means (23) creates the information group (28) for rewriting other than the suction information group (19), and may update the specified value of the sucking position (Q) to the desired plate parts (M) in the suction information group (19), based on the content of the created information group (28) for rewriting. Moreover, a save means (26) that saves the specified value in default may be provided.

When the sucking position change operation means (23) creates the information group (28) for rewriting other than the suction information group (19), the specified value of the sucking position (Q) can be changed temporarily, and the specified value can be updated after checking the content. Therefore, the update operation becomes easier and the errors are unlikely to happen in updating. Moreover, the original specified value can be recognized even if there is a mistake in updating when providing the save means (26) that saves the specified value in default in the suction information group (19), so that the specified value can be corrected easily when updating again.

The suction information group (19) may include the description of the specified value of the sucking position (Q) regarding the respective plate parts (M) and the parts name, and the same parts search means (24) may search the same parts (M) by the parts name. The term parts name here is the identification information by which the operator can recognize the content, and it does not include such as a bar code and the row of the simple binary code that can be recognized only by the machine. If the parts name is made by the combination of the alphanumeric letters, it is considered that there is some meaning in the respective letters and codes.

When the suction information group (19) includes the description of the specified value of the sucking position (Q) regarding the respective plate parts and the parts name, the same parts search means (24) can not only search the same parts by the parts name, but also the operator can confirm the search result of the same parts research means (24) after discriminating the plate parts. Therefore, the control can be done with high reliability, and the specified value of the specific parts (M) can be differed from the specified value of the other same parts (M) such as the parts that exist in the specific site of the plate (W), and it is convenient to use.

DETAILED DESCRIPTION OF THE PREFERRED EMBODIMENTS

Figure 1:
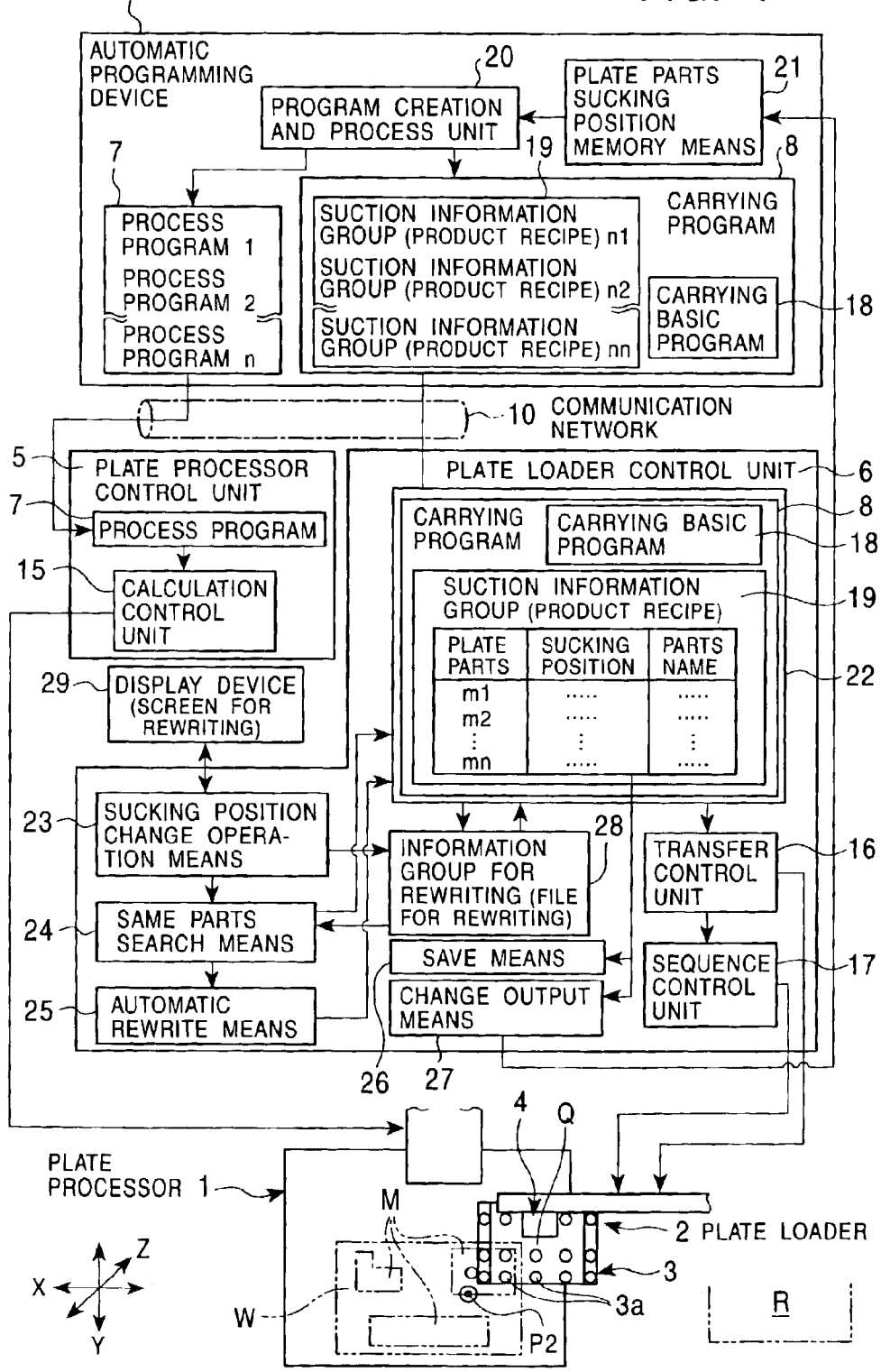
FIG. 1 is a block diagram, illustrating a conceptual configuration of a plate parts carrying system in a preferred embodiment of the present invention.
Figure 2:
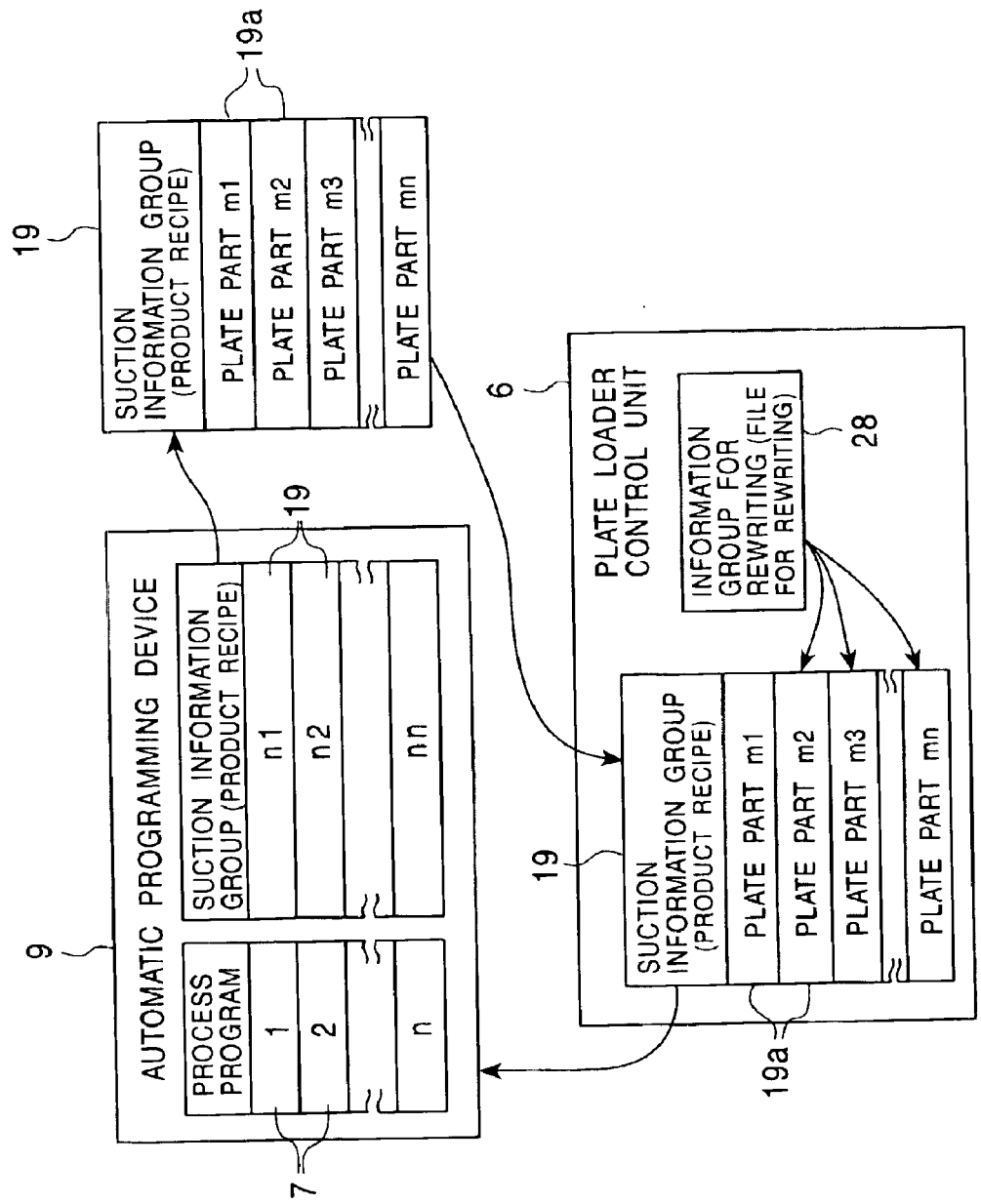
FIG. 2 is an explanatory drawing, illustrating a flow of a suction information group in the plate parts carrying system.

A preferred embodiment of the present invention will be described with reference to the drawings. FIG. 1 is an explanatory drawing of a conceptual configuration of a plate parts carrying system including a plate loader control unit. FIG. 6–FIG. 10 show concrete examples of a plate processing equipment that is controlled by the plate parts carrying system.

According to FIG. 1, the plate parts carrying system is applied to plate processing equipment comprising a plate processor 1 and a plate loader 2. The plate processor 1 is a processing device that cuts out a plurality of plate parts M from a plate W. The plate loader 2 is the device that sucks and carries the plate parts M that are cut out from the plate by the plate processor 1, which comprises a suction member 3 that sucks the plate parts M and a suction member transfer means 4 that transfers the suction member 3 to the horizontal direction (orthogonal 2-axis, X and Y directions). A suction member transfer means 4 also transfers the suction member 3 to the up and down direction (Z-axis direction). The suction member 3 has a plurality of unit suction members 3a comprising a vacuum suction pad, etc.

As illustrated in FIG. 6–FIG. 10, the plate processing equipment comprises a plate processor 1A that carries out a preparatory process and the plate processor 1 for a post-processing that receives the plate W that is processed by the plate processor 1A and processes the received plate W continuously. The respective plate processors 1 and 1A, which are machines capable of making holes and cutting the plate W, comprises a punch press and a laser processor, etc. In the preferred embodiment of the present invention, a turret-type punch press is used as the plate processor 1A for the preparatory process, and a punch press having an original punch tool is used as the plate processor 1 for post processing. A carry-in device 53 that carries the plate W to the plate processor 1A for the preparatory process as the material is provided to the line of the plate processors 1A and 1, and the plate loader 2 is provided as the device that carries the plate parts M to be finished products out from the plate processor 1 for post-processing.

In the specification and drawings of the present invention, the both plate processors 1A and 1 will be described by adding the same codes to the corresponding parts of both processors, except for the parts that need distinction. The both plate processors 1A and 1 comprise a process part 56 that processes the plate W on a table 55 respectively at predetermined process positions P1 and P2, and a plate feed mechanism 57 that transfers the plate W on the table 55 to the orthogonal 2-axis (X-axis, Y-axis) directions. The process part 56 comprises a punch drive mechanism that makes a punch tool up and down by a ram. Regarding the plate feed mechanism 57, a cross slide 60 is set so as to move freely to right and left direction (X-axis direction) in a carriage 59 that is set on a base 58 so as to move freely to back and forth direction (Z-axis), and a plurality of work holders 61 that grip the edge part of the plate W is installed in the cross slide 60. The carriage 59 and the cross slide 60 are driven by the respective servomotors 62 and 63 through ball screws 64 and 65. Regarding the both plate processors 1A and 1, the plate W is delivered directly in between the respective plate feed mechanisms 57.

Figure 7:
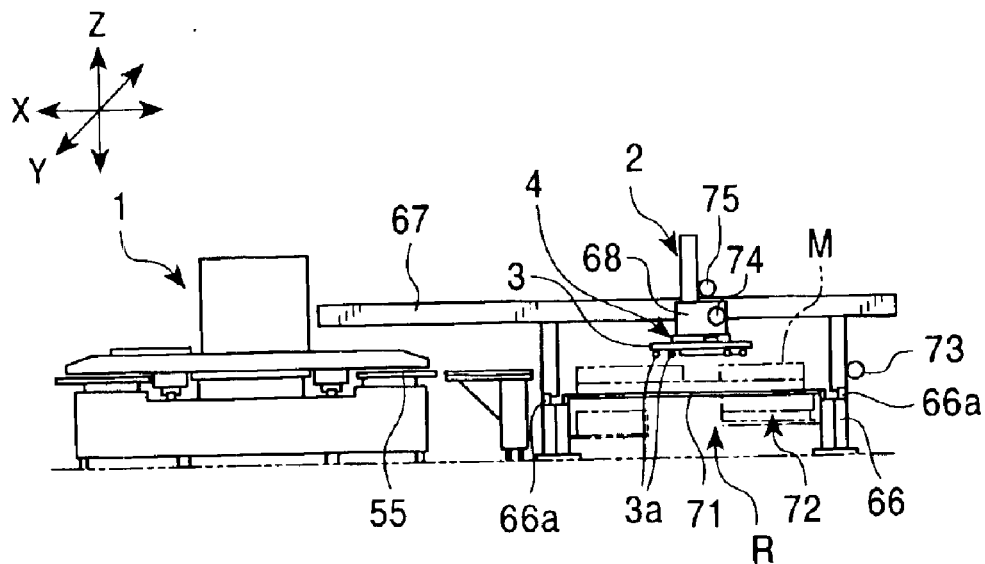
FIG. 7 is a front view of the plate loader.

Regarding the plate loader 2, a rail 67 is set up in a base 66 so as to move right and left (X-axis direction) freely as the suction member transfer means 4, a traveling body 68 is set up along the rail 67 so as to move right and left (X-axis direction), and the suction member 3 is set up in the traveling body 68 so as to move up and down. The base 66 is provided around a loading area R for loading the plate parts M that are carried out from the plate processor 1 by the plate loader 2, and as illustrated in FIG. 7, the carried plate parts M are loaded on a movable pallet 71 that is set in the base 66. A pallet 72 for loading skeleton (not shown in the drawings) remaining after cutting out the plate parts M of the plate W is provided in the base 66, as well as the pallet 71 for the plate parts M. The base 66 has a rail 66a for traveling of the rail 67 on both side parts.

The suction member transfer means 4 of the plate loader 2 can be driven to the respective axis directions by respective servomotors 73–75. More specifically, the rail 67 is driven by the Y-axis servomotor 73, the traveling body 68 is driven by the X-axis servomotor 74, and the suction member 3 can be moved up and down by the Z-axis servomotor 75.

Figure 8:
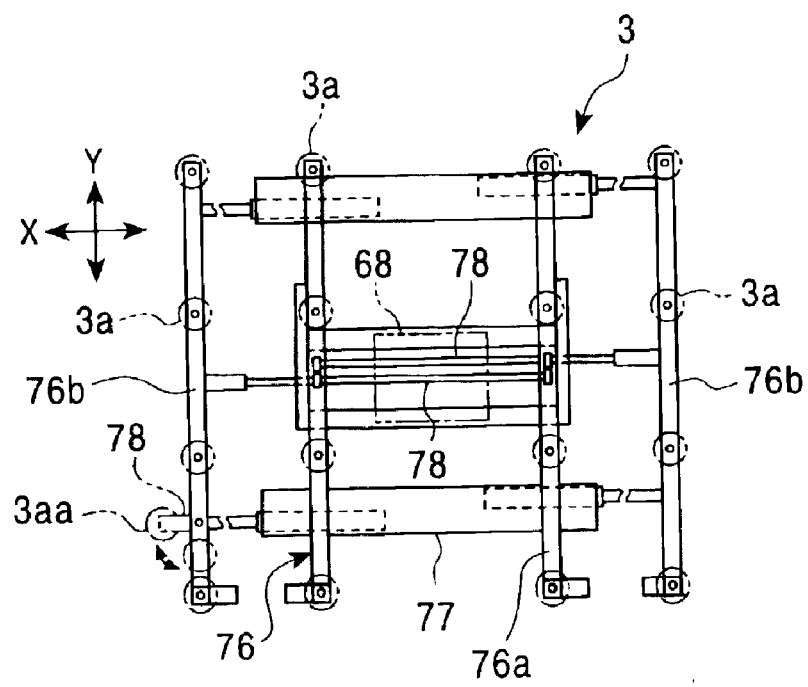
FIG. 8 is an enlarged plan view of the suction parts.
Figure 9:
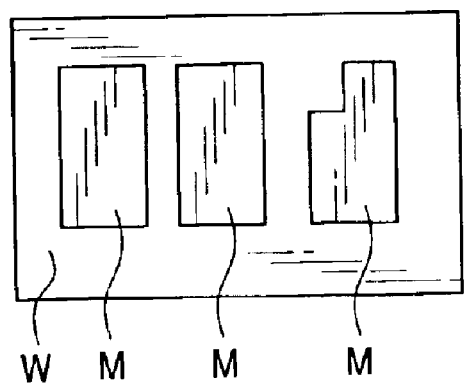
FIG. 9 is an explanatory drawing, illustrating a cutting plan of the plate parts in the plate.
Figure 10:
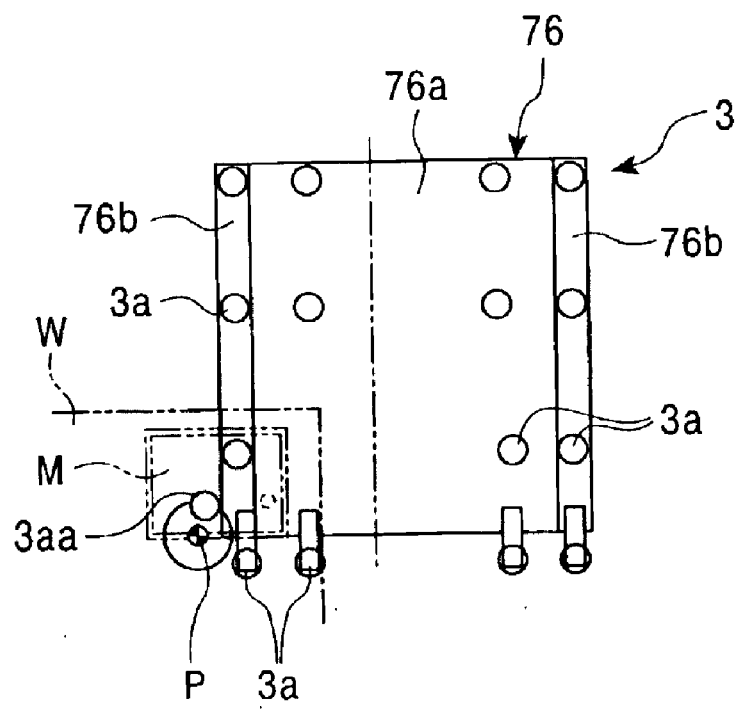
FIG. 10 is a plan view, illustrating the examples of the positional relation of the suction parts and the plate member on a plate processor.

As illustrated respectively in a detail drawing and a pattern diagram of FIG. 8 and FIG. 10, a plurality of unit suction members 3a are installed in a support frame 76. The support frame 76 comprises a fixed frame part 76a in the center and movable frame parts 76b on both sides. The movable frame part 76b is supported so as to transfer right and left to the fixed frame part 76a by a guide 77, and a plane area of the suction member 3 can be larger and smaller by transferring the movable frame part 76b. A movable frame transfer device 78 such as the cylinder device drives the movable frame part 76b in order to move. The unit suction member 3a is provided on the both the fixed frame part 76a and the movable frame part 76b.

A specific unit suction member 3aa, disposed in the vicinity of the front end of the suction member 3 on the plate processor 1 side, is provided so as to move in and out to the plate processor 1 side of the support frame 76 by the movable frame transfer device 78. The movable frame transfer device 78 comprises a rotating arm and the rotating drive source, and the specific unit suction member 3aa is installed in the rotating arm. The specific unit suction member 3aa is provided so as to suck the plate parts M by accessing to the process position P2 in the plate processor 1 as much as possible without interfering with the plate processor 1. The support frame 76 of the suction member 3 may not always enlarge or reduce the size as described above. If the support frame 76 is capable of enlarging and reducing the size, the specific suction member 3aa is set up in the movable frame 76b.

A vacuum suction path is provided in the suction member 3 such that the switching of sucking each unit suction member 3a and the release can be done individually or by the group. Moreover, the unit suction members 3a of the suction member 3 in a predetermined area on the plate processor 1 side, including the specific unit suction member 3aa, are comprised as a suction pad group that includes small suction pads. Therefore, the unit suction member 3aa, etc. are capable of sucking, if a part of the suction member such as the plate parts M is departed from the suction surface.

A control system will be described with reference to FIG. 1–FIG. 5. A plate processor control unit 5 and a plate loader control unit 6, controlling based on a process program 7 and a carrying program 8 respectively, control the plate processor 1 and the plate loader 2. An automatic programming device 9 is provided for creating both the process program 7 and the carrying program 8, and capable of transmitting the created respective programs 7 and 8 to the plate processor control unit 5 and the plate loader control unit 6 respectively through a communication network 10. Additionally, if the plate processing equipment is comprised by a plurality of the plate processors 1A and 1 that carry out the preparatory and post processes as illustrated in the example of FIG. 6, the automatic programming device 9 also creates the process program of the plate processor 1A for the preparatory process, as well as the process program 7 of the plate processor 1 for the post-process.

The communication network 10 may be a local area network such as Ethernet (registered trademark), as well as a wide area network or Internet, etc.

Figure 3:
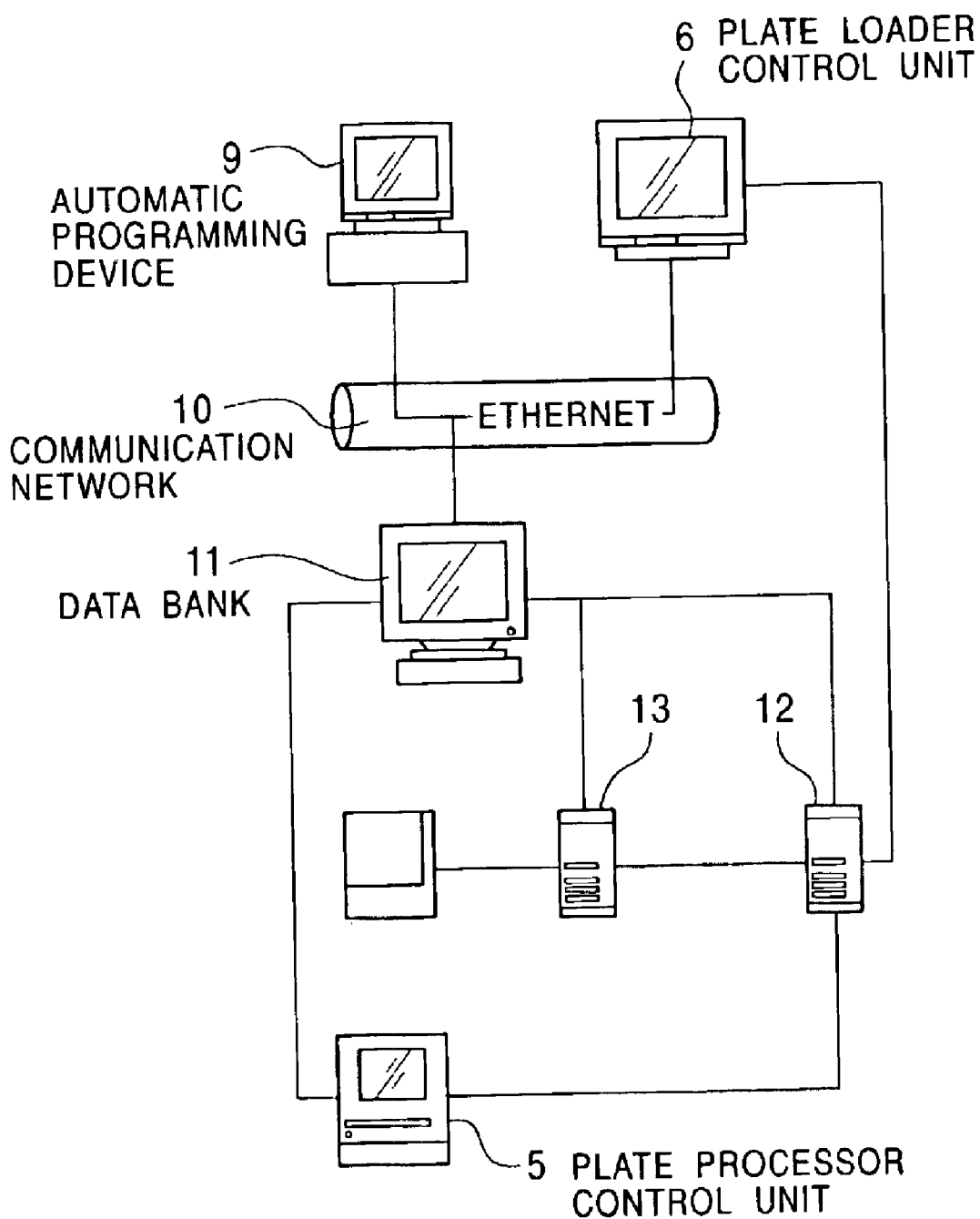
FIG. 3 is a block diagram of an example of a hardware configuration of the plate parts carrying system.
Figure 4:
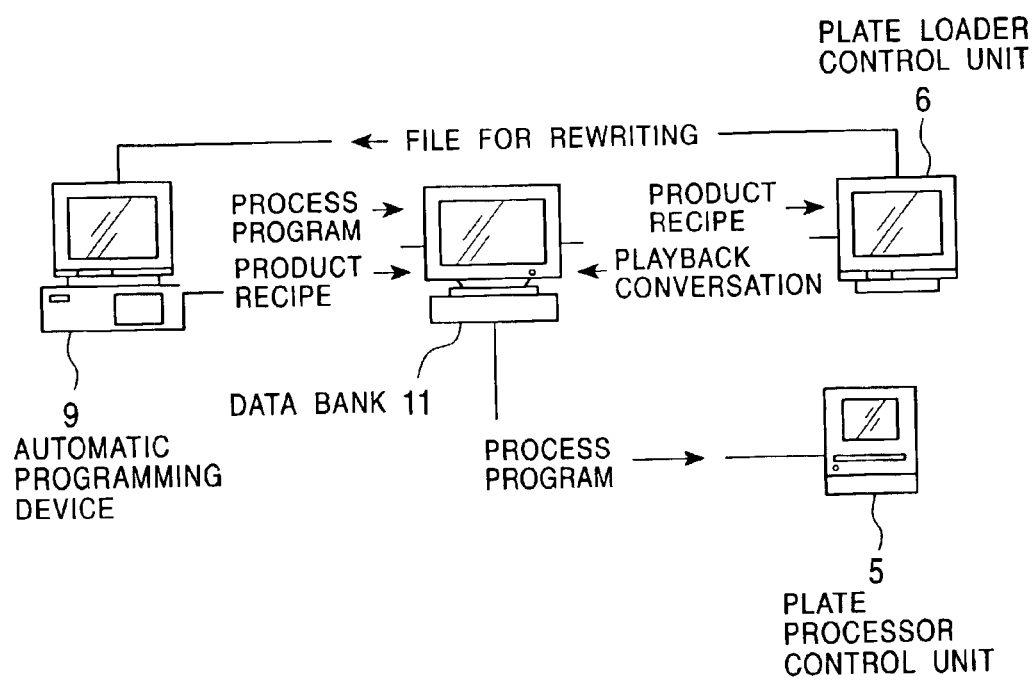
FIG. 4 is an explanatory drawing, adding a data flow after simplifying the block diagram in FIG. 3.

As illustrated in the hardware configuration example of FIG. 3, the plate processor control unit 5 is connected to the automatic programming device 9 through the communication network 10 and a data bank 11. The data bank 11 is a computer that registers a plurality of the process programs 7 (FIG. 1), however it is not necessarily provided. Moreover, the plate processor control unit 5 and the plate loader control unit 6 comprise the computer and a part or the whole of programmable logic controllers 12 and 13, as illustrated in FIG. 3.

In FIG. 1, the plate processor control unit 5, which is numerical control type, comprises a calculation control unit 15 that executes the process program 5. The plate loader control unit 6, which is numerical control type, comprises a transfer control unit 16 as a part of the calculation control unit (not shown in the drawing) that executes the carrying program 8 and a sequence control unit 17. The sequence control unit 17 comprises programmable machine controllers 12 and 13, etc. as illustrated in the example of FIG. 3. The transfer control unit 16 is a means that controls the transfer of the suction member transfer means 4 to each axis in the loader unit 2. The sequence control unit 17 is a means that controls the loader device 2, which controls the start of sucking and releasing the suction member 3, and the scaling of the support frame 76 of the suction member 3, etc.

The carrying program 8 comprises a carrying basic program 18 and a suction information group 19. The suction information group 19, as described later, is so-called a product recipe. The carrying basic program 18 is a program for regulating a specified value of the stop position of the suction member 3 by the suction member transfer means 4 and a part of the control matter such as a predetermined movement of the suction member 3 by the parameter, which sets a basic movement of the suction member transfer means 4 and the suction member 3. The respective instructions of a sequence of the movements, such that the suction member 3 transfers from a predetermined waiting position (such as a starting point) in a transfer route to the plate processor 1, sucks the plate parts M at the sucking position and carries them to the loading area R, and goes back to the waiting position after releasing the suction of the plate part M, are described in the carrying basic program 18. The specified value of a sucking position Q is set by the parameter.

The suction information group 19 sets the actual value, regarding the matter that is set in the carrying basic program 18 by the parameter. The suction information group 19 sets the specified value of the sucking position Q that is the stop position of the suction member 3 to the horizontal direction and the other predetermined matters, regarding one group of the respective plate parts M. The one group of the respective plate parts M is a group of the plate parts M that are cut off from one plate W in the example, and the suction information group 19 is provided in every one plate W. The specified value of the sucking position Q is set by the X and Y coordinate.

For example, the information, on which unit suction member 3a is chosen to suck (in other words, to be the suction state) and whether or not the support frame 76 in the suction member 3 is made to be extended, is set as the above predetermined matter in the suction information group 19, as well as the specified value of the sucking position Q, and the parts name is added to the respective plate parts M (m1, m2, ... ). The term parts name here is the identification information that the operator can recognize the content, and it does not include a bar code that can be recognized only by machines and the row of simple binary codes. The parts name may be comprised as the combination of the alphanumeric characters, etc., however in the case, the letter or code in each digit includes some meaning that the person can understand.

As described above, the suction information group 19, which sets the specific carrying information on the plate parts M that is the respective products with each plate W, becomes the product recipe.

The automatic programming device 9, which creates the process program 7 and the carrying program 8 from the information of the plate W that becomes a material and the shape data of the plate parts M to be processed, includes a program creation and process unit 20 that processes the created programs. The basic carrying program 18 and the suction information group 19 in every plate W are created as the carrying program 8. The suction information group 19 is provided corresponding to every process program 7. The automatic programming device 9 also has a sucking position memorizing means 21 in every plate part that sets a specified value of the sucking position in advance, regarding the predetermined plate parts M. The automatic programming device 9 creates the suction information group 19 by the program creation and process unit 20, using the memory information of the sucking position memorizing means 21 in every plate part.

The plate loader control unit 6 comprises a memory means 22 that memorizes the carrying basic program 18 of the carrying program 8 and the suction information group 19 in the predetermined memory area. The carrying program 8 memorizing in the memory means 22 is created in the automatic programming device 9 and transmitted through the communication network 10. However, the carrying program 8 may be created by the other appropriate means other than the way in the automatic programming device 9, and the other form of transmission can be also available, for example, the carrying program 8 is memorized in the memory means 22 through the other recording medium (not shown in the drawings) such as a flexible disk and a memory chip. The plate loader control unit 6 has a sucking position change operation means 23 that changes such as the specified value of the sucking position Q in the suction information group 18 of the memorized carrying program 8 as described above.

Moreover, the plate loader control unit 6 comprises a same parts search means 24 that searches the same part as the plate parts M whose specified value of the sucking position Q is changed from the suction information group 19, an automatic rewrite means 25 that rewrites the specified value of the sucking position Q of the searched respective plate parts M to the same value as the specified value of the above changed sucking position Q, a save means 26, and a change output means 27.

The sucking position change operation means 23 creates an information group 28 for rewriting in the memory area other than the memory area wherein the suction information group 19 to be executed is memorized as the process of changing the above specified value, and updates the specified value of the sucking position Q to the desired plate parts M (m1, m2, ... ) in the suction information group 19 based on the content of the created information group 28 for rewriting. The information group 28 for rewriting is created as one file, for example. The information group 28 for rewriting is provided in the unit of the plate parts M, and includes each matter included in the suction information group 19, as well as the specified value of the sucking position Q and the parts name, for example, the selecting information of the unit suction member 3a. The sucking position change operation means 23 changes the above specified value, etc. by being input by the input means such as a key board and a touch panel.

The save means 26, that saves the content of the suction information group 19 in default, memorizes the suction information group 19 in the predetermined memory area for saving, when the carrying program 8 is transmitted to the plate loader control unit 6 or any given occasion. The save means 26 is not capable of changing the memory content of part of the suction information group 19.

The change output means 27 is the means that outputs the specified value of the changed sucking position Q to the automatic programming device 9. The change output means 27 outputs the whole information on the respective plate parts M whose specified value of the sucking position Q is changed in the suction information group 19 to the automatic programming device 9 in the preferred embodiment of the present invention. The information is output to the automatic programming device 9 through the communication network 10, however it can be also output through the recording medium such as a flexible disk.

The automatic programming device 9 memorizes the output information of every plate part M in the sucking position memorizing means 21 in every plate part, and the memory content is used for creating the new carrying program by the program creation and process unit 20. More specifically, the automatic programming device 9 reflects the specified value of the sucking position Q after changing to the specified value of the sucking position Q of the same plate parts M as the plate parts M whose specified value is changed or the plate part M that has a predetermined relation with the plate part M whose specified value is changed. The specified value of the sucking position Q after changing can be used in the reflection without changing, and the value processing the difference generated by the change of the sucking position Q properly can be also used according to the set process standard.

The sucking position change operation means 23 indicates the screen for rewriting on a display device 29, and the contents of the suction information group 19 and the information group 28 for rewriting are displayed on the screen. The display device 29 is, for example, a liquid crystal display or a cathode-ray tube, etc. that are provided in the control panel of the plate loader control unit 6, or the device that a touch panel is added to the display as described above as the input means.

Figure 5:
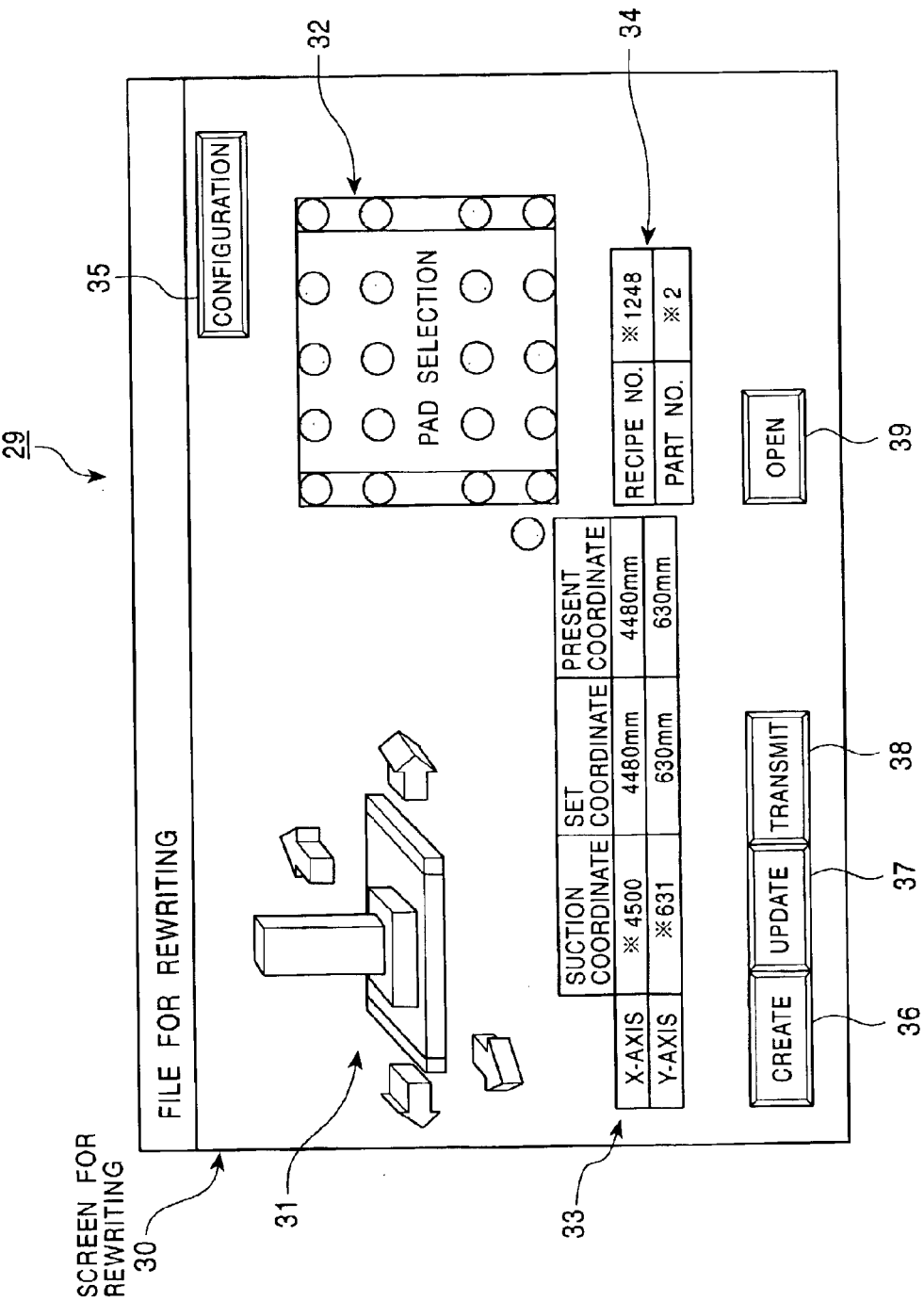
FIG. 5 is an explanatory drawing, illustrating a screen for rewriting in the plate loader control unit of the plate parts carrying system.
Figure 6:
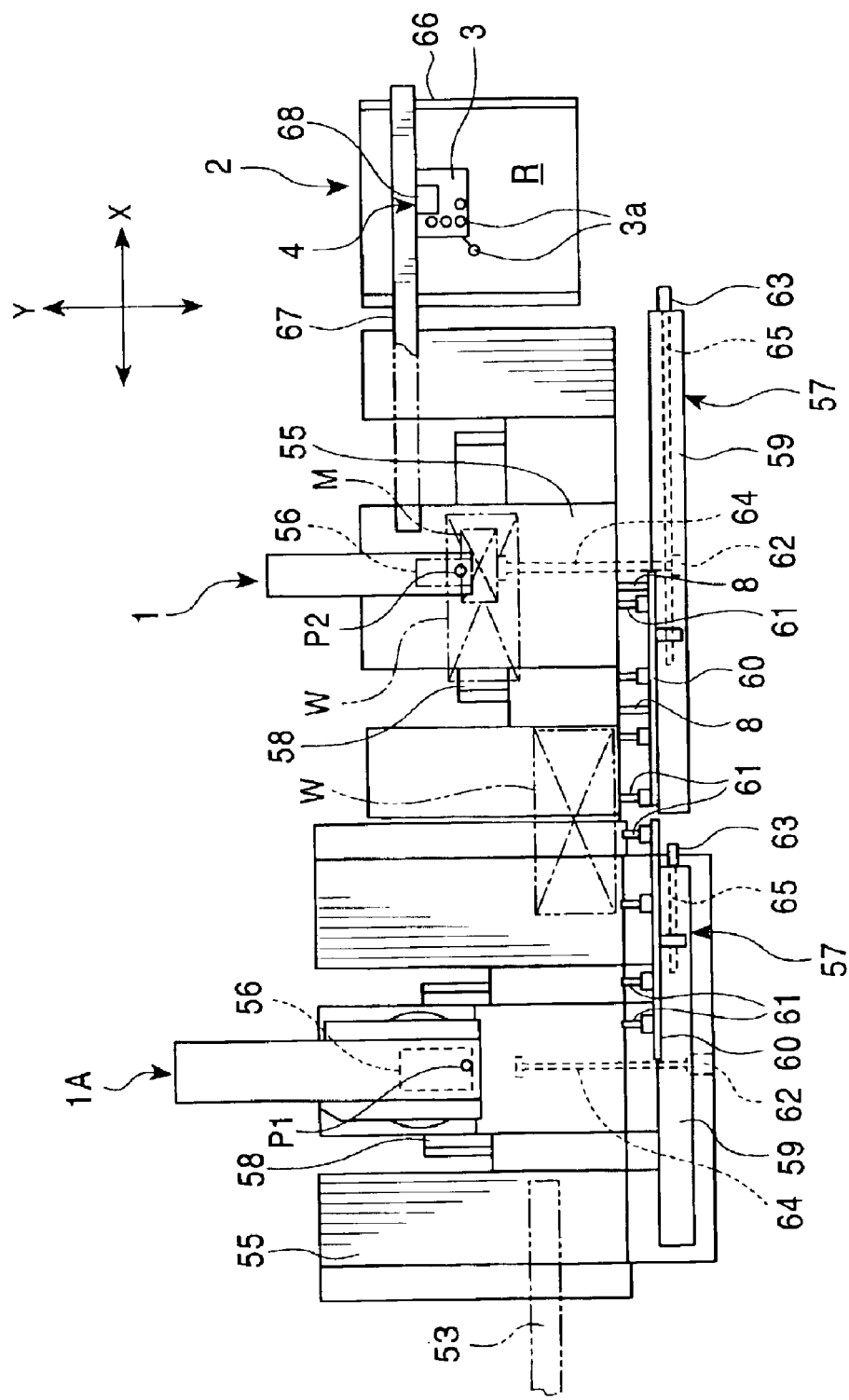
FIG. 6 is a plan view of a concrete example of a plate processing equipment, applying the plate parts carrying system.

FIG. 5 illustrates one example of the screen for rewriting. A screen 30 for rewriting displays a type display 31 that illustrates the position of the suction member 3, a pad configuration indicator chart 32 illustrating the configuration of each unit suction member 3a of the suction member 3, a position calculating table 33 illustrating the coordinate position to each axis direction of the suction member 3, a recipe and parts display 34 illustrating which suction information group 19 is corresponded to which plate parts M respectively, and various kinds of key displays 35–39. The key displays 35–39 become software keys, and it can be controlled by a pointing device of the key as the touch panel.

The position calculating table 33 displays a suction coordinate, a set coordinate, and a present coordinate respectively. The suction coordinate is a value of transmitting the suction information group 19 to the plate loader control unit 6, that is saved by the save means 26. The set coordinate is a value of carrying out the suction information group 19. The present coordinate is a value of the position that the suction member 3 is really existed. The set coordinate in the above coordinates is capable of being rewritten by the input means at the predetermined time. The number display of the recipe and parts display 34 is capable of being rewritten at the predetermined time.

The key display 36 of "create" in the above respective key displays 35–39 is a means that instructs to create the information group 28 for rewriting (the file for rewriting) (FIG. 1). The key display 37 of "update" is a means that instructs to update the suction information group 19 according to the content that is displayed on the screen. The display key 38 of "transmit" is a means that outputs the content of the updated suction information group 19 to the automatic programming device 9 by the change output means 27. The relation between the other matter in the screen 30 for rewriting and the respective components of the plate loader control unit 6 will be described with reference to the next operational explanation.

Next, the operation of above configuration will be described. First, the outline of the relation of the respective information will be described with reference to FIG. 2 and FIG. 3. The automatic programming device 9 creates the process program 7 and the suction information group (product recipe) 19 automatically. The suction information group (product recipe) 19 is provided in every process program 7. One suction information group (product recipe) 19 includes information in every part 19a of the respective plate parts M (m1, m2, . . . ) in a sheet of the plate W. The suction information group (product recipe) 19 is memorized in the predetermined memory area after transmitting from the automatic programming device 9 to the plate loader control unit 6. When the content of the suction member specified value, etc. of the suction information group (product recipe) 19 is changed, the information group 28 for rewriting (the file for rewriting) to the plate parts M to be changed is created. The information group 28 for rewriting is corresponded to one information 19a in every part, and the content is made by copying the information 19a in every part when creating. The suction information group (product recipe) 19 memorized in the plate loader control unit 6 is updated based on the content of changing the information group 28 for rewriting (the file for rewriting), and after that, the plate loader control unit 6 controls based on the updated content. Moreover, the updated content of the information group 28 for rewriting (the file for rewriting) is output to the automatic programming device 9, and the automatic programming device 9 reflects the above updated content when creating the next suction information group 19.

The detail of the operation of the above configuration will be described in more detail. The plate loader 2 is operated automatically by the control of the plate loader control unit 6, based on the carrying program 8. It is controlled such that the stop position of the suction member 3 that is the sucking position Q becomes a specified value (the set coordinate of FIG. 5) of the sucking position specified in every plate part M (m1, m2, . . . ) in the suction information group (product recipe) 19, when the plate loader 2 sucks the plate parts M that are cut out by the plate processor 1. At that time, if the specified value is inappropriate, the plate loader 2 is not capable of sucking the plate parts M, or does not suck the plate parts correctly, so that the parts are fallen from the plate loader 2. When the imperfect suction is detected, the above specified value is changed by the plate loader control unit 6.

The screen 30 (FIG. 5) for rewriting is indicated on the screen, and the specified value is changed by the sucking position change operation means 23. When the contents of the spaces of the recipe number and the parts number are rewritten in the recipe and parts display on the screen 30 for rewriting, and the display key 39 indicating the instruction "open" is switched on, the screen displaying the content indicated in the recipe and parts display 34 is appeared. Additionally, the screen is set to show the content of the plate parts M that is processed at present when the instruction for displaying the screen 30 for rewriting is input by the sucking position change operation means 23, and there is no need to input to the recipe and parts display 34 if there is no need to change the other plate parts M.

When the key display 36 of "create" is switched on in the state of displaying the screen 30 for rewriting, the information group 28 for rewriting (the file for rewriting) (FIG. 1 and FIG. 2) on the plate parts M is created. After the information group 28 for rewriting (the file for rewriting) is created, the content of the set coordinate on the screen 30 for rewriting can be rewritten. In this state, the desired coordinate is written as the specified value of the sucking position Q in the space of the content of the set coordinate. Then, the operator can recognize the values of the original suction coordinate and the present coordinate, and the state of the plate loader 2 on the screen, so that the appropriate specified value can be determined easily. If the unit suction member 3a used for the suction is changed, the pointing device and the other input means are operated to change the unit suction member 3a that is chosen on the screen.

Only the screen that displays the content of the information group 28 for rewriting (the file for rewriting) is changed at the point of rewriting the display content of the screen 30 for rewriting, so that it is needed to switch on the key display 37 of "update" for updating the content of the suction information group 19. When the key display 37 of "update" on the screen 30 is switched on, the sucking position change operation means 23 of FIG. 1 updates the content of the suction information group 19 that is existed in the memory area for executing to the same content as the content of the information group 28 for rewriting (the file for rewriting).

Moreover, when the key display 37 of "update" is switched on, the same parts search means 24 searches the same parts as the plate parts M under the change process in the suction information group 19 in the memory area for executing, and the specified value of the sucking position Q of the respective searched plate parts M is rewritten to the same value as the specified value of the sucking position in the information group 28 for rewriting (the file for rewriting) by the automatic rewrite means 25. If the choice information, etc. of the unit suction member 3a is changed in the information group 28 for rewriting (the file for rewriting), the change content is also changed in the information group 28 for rewriting (the file for rewriting).

As described above, the specification, etc. of the sucking position Q in the information group 28 for rewriting (the file for rewriting) is changed, and after that, the plate loader control unit 6 controls the plate loader 2 based on the changed content.

Moreover, when the key display 38 of "transmit" is switched on, after the key display 37 of "update" as described above is switched on, the information on the respective plate parts M that is updated in the information group 28 for rewriting (the file for rewriting) is output to the automatic programming device 9. The automatic programming device 9 updates the memory content of the sucking position memory means 21 in every plate part based on the output information and the update is reflected to the next program creation.

According to the configuration as described above, if the carrying program 8 that is created automatically in the automatic programming device 9 is transmitted to the plate loader control unit 6 through the communication network 10, or the specified value of the sucking position Q that is specified in the suction information group 19 of the carrying program 8 is inappropriate, the specified value can be changed by the function of the sucking position change operation means 2 in the plate loader control unit 6 near the plate loader device 2. Then, if not only the plate parts M whose specified value is changed but also the same plate parts M as the above plate parts are included in the suction information group 19, the specified value of the plate parts M is changed automatically by the function of the same parts search means 24 and the automatic rewrite means 25.

Moreover, the change is not limited in the plate loader control unit 6, the change content is output to the automatic programming device 9 by the change output means 27, and the change can be reflected to the next programming creation.

Additionally, in the above preferred embodiment of the present invention, the carrying program 8 that is created in the automatic programming device 9 equipped with the plate parts carrying system is changed by the change output means 27, however the original carrying program 8 can be created by the other means. For example, the carrying program 8 that is created by the proper means other than the automatic programming device 9 of the plate parts carrying system is executed in the plate loader control unit 6, the specified value of the sucking position is changed by the change output means 27 based on the operational condition by the execution, the changed specified value is output to the automatic programming device 9 equipped with the plate parts carrying system, and the specified value after changing can be reflected to the creation of the carrying program 8 by the automatic programming device 9.

Moreover, in the above preferred embodiment of the present invention, the case that the plate processor 1 using the plate loader 2 of the plate parts carrying system is the plate processor 1 for post-processing in the plate processing equipment combining the plate processors 1a and 1 for preparatory and post-processing is described. However, the plate processor using the plate loader in the plate parts carrying system may be the composed of the plate processing equipment independently. Moreover, for example, the plate processor using the plate loader 2 may be a turret type punch press such as the plate loader 1A for the preparatory process in the preferred embodiment of the present invention. In the case, the turret type punch press may include a subhead (not shown in the drawings) that is a punch drive mechanism having the individual punch tool in the vicinity of the process position P1. In the case of the punch press with the subhead, the subhead is used for cutting off the plate parts after being processed by the turret punch tool, and the plate loader 2 is used for carrying the cut off plate parts M out.

The plate parts carrying system of the present invention comprises the automatic programming device that creates the process program and the carrying program, and the plate loader control unit that controls the plate loader based on the carrying program that is transmitted from the automatic programming device through the communication line, wherein the plate loader comprises the suction member that sucks the plate and the suction member transfer means that transfers the suction member to the horizontal direction, and the carrying program includes the value specifying the sucking position that is the stop position of the suction member to the horizontal direction in order to suck the plate parts that are cut out from the plate by the plate processor based on the process program. Therefore, it does not take much trouble to supply the carrying program from the automatic programming device to the plate loader control unit, and the plate parts can be sucked automatically based on the process.

If the plate loader control unit comprises the sucking position change operation means that changes the specified value of the sucking position for when the suction parts cannot suck the plate parts at the specified value of the sucking position, the specified value of the sucking position can be changed on the spot in automatic operation and the sucking position can be surely changed in short time under the automatic control, when the specified value of the sucking position of any plate parts is inappropriate in the carrying program.

If the plate loader control unit comprises the change output means that outputs the specified value of the changed sucking position to the automatic programming device, and the automatic programming device reflects the specified value of the sucking position after changing that is output from the change output means to the specified value of the sucking position of the same plate parts as the plate parts whose specified value is changed and the plate parts that has a predetermined relation with the plate parts whose specified value is changed, when the specified value of the sucking position of the plate parts is changed on the spot, the change of the specified value of the sucking position of the plate parts is reflected, and the appropriate carrying program can be easily created when creating the next program.

The other plate parts carrying system of the present invention comprises the plate loader control unit that controls the plate loader based on the carrying program and the automatic programming device that creates the process program and the carrying program, wherein the plate loader comprises the suction member that sucks the plate and the suction member transfer means that transfers the suction member to the horizontal direction, the carrying program includes the value specifying the sucking position that is the stop position of the suction member to the horizontal direction for sucking the plate parts that are cut out from the plate by the plate processor based on the process program, the plate loader control unit comprises the sucking position change operation means that changes the specified value of the sucking position for when the suction member does not suck the plate parts at the specified value of the sucking position and the change output means that outputs the changed specified value of the sucking position to the automatic programming device, and the automatic programming device reflects the specified value of the sucking position after changing that is output from the change output means to the specified value of the sucking position of the same plate parts as the plate parts whose specified value is changed and the plate parts that have a predetermined relation with the plate parts. Therefore, the specified value of the sucking position can be changed on the spot under automatic operation and the sucking position can be surely changed immediately under automatic control, if the specified value of the sucking position of any plate parts is inappropriate in the carrying program. Moreover, if the specified value of the sucking position of the plate parts is changed on the spot, the change of the specified value of the sucking position is reflected to the same kind of the plate parts, and the appropriate carrying program can be easily created when creating the next program.

Moreover, the plate loader control unit of the other invention, controlling the plate loader having the suction member that sucks the plate parts and the suction member transfer means that transfers the suction member to the horizontal direction, comprises the suction information group that sets the specified value of the sucking position that is the stop position of the suction member to the horizontal direction regarding one group of the respective plate parts when sucking the plate parts that are cut out from the plate by the plate processor, and the transfer control unit that controls the sucking position by the transfer of the suction member transfer means based on the specified value of the suction information group. The plate loader control unit comprises the sucking position change operation means that changes the specified value of the sucking position to the desired plate parts of the suction information group, the same parts search means that searches the same parts as the plate parts whose specified value of the sucking position is changed from the above suction information group, and the automatic rewrite means that rewrites the specified value of the sucking position of the respective searched plate parts to the same value as the specified value of the changed sucking position, so that the sucking position specified value of the same parts can be changed automatically, the suction failure of the same parts is prevented from occurring in advance, and the change operation can be eliminated by the operator, if the specified value of the sucking position of any plate parts is changed because of the inappropriate specified value.

If the sucking position change operation means updates the information group for rewriting other than the suction information group, updates the created information group for rewriting based on the created content of the information group for rewriting, and the save means that saves the specified value in default in the above section information group, the specified value can undo immediately if there is an error in the change of the specified value of the sucking position, and the specified value can be changed easily again.

The suction information group includes the description of the specified value of the sucking position and the parts name of the respective plate parts, and if the same pats search means searches the same parts by the parts name, the same parts can be easily searched, the operator can check the operation easily, and the reliability can be improved and the system can be used mode conveniently.

What is claimed is:

1. A plate parts carrying system comprising:

an automatic programming device that creates a process program and a carrying program;

wherein the carrying program is transmitted from the automatic programming device to a plate loader control unit that controls a plate loader based on the carrying program;

wherein the plate loader comprises a suction member that suctions a plate part and a suction member transfer means that transfers the suction member in a horizontal direction;

wherein the transmitted carrying program includes an original value specifying a stop position of the suction member in the horizontal direction which is the suctioning position for suctioning plate parts that have been cut out from a whole plate by a plate processor based on the process program;

wherein the plate loader control unit further comprises a suctioning position change operation means that changes the original value of the suctioning position upon the suction member being unable to suction the plate parts at the original value for the suctioning position.

2. A plate parts carrying system as in claim 1, further comprising:

a change output means for outputting the changed value of the suctioning position to the automatic programming device, and the automatic programming device including a means for updating the carrying program to plate parts identical to the plate parts whose value changed and plate parts that have a predetermined relationship with the plate parts whose value changed.

3. A plate parts carrying system comprising:

a plate loader control unit that controls a plate loader based on a carrying program; and an automatic programming device that is capable of creating a process program and the carrying program, wherein the plate loader comprising:

a suction member that suctions a plate; and a suction member transfer means that transfers the suction member in a horizontal direction, the carrying program comprising:

a value specifying a suction position that is a stop position of the suction member in the horizontal direction for suctioning plate parts that are cut out from a plate by a plate processor based on the process program;

the plate loader control unit comprising:

a suctioning position change operation means that changes the specified value of the suctioning position upon the suctioning member being incapable of suctioning the plate parts at the original value for the suctioning position; and a change output means that outputs a new value of the suctioning position to the automatic programming device for the plate parts whose value changed, whereupon the automatic programming device updates the carrying program to reflect new values for the suctioning position of plate parts identical to the plate parts whose value changed and the plate parts that have a predetermined relationship with the plate parts whose value changed.

4. A plate loader control unit controlling a plate loader equipped with a suction member for suctioning plate parts and a suction member transfer means for transferring the suction member in the horizontal direction, further comprising:

a suction information group specified for one group of respective plate parts; and a transfer control unit that controls suctioning positions by transferring the suction member transfer means based on values for the group of respective plate parts saved in the suction information group, and further comprising:

a suctioning position change operation means that creates a information group for rewriting which updates the value of the suction position in the suction information group;

a same parts search means that searches for parts in the suction information group; and an automatic rewrite means that rewrites the values for the suctioning position of plate parts in the group of respective plate parts to coincide with the updated value.

5. A plate loader control unit as in claim 4, wherein the suctioning position change operation means creates the information group for rewriting other than the suction information group, updates the specified value of the sucking position to the desired plate parts in the suction information group based on the content of the created information group for rewriting, and a save means that saves the specified value in default in the suction information group.

6. A plate loader control unit as in claim 5, wherein the specified value of the suctioning position and the corresponding parts names of the respective plate parts are described in the suction information group, and the same parts search means includes a means for searching by the part's name.

* * * * *